(12) United States Patent
Pan (10) Patent No.: US 10,015,606 B2
(45) Date of Patent: Jul. 3, 2018

(54) INTELLIGENT ACOUSTO-OPTIC CONTROLLER

(71) Applicant: Changzhou U Sheng Electronic Ltd., Changzhou (CN)

(72) Inventor: Lijun Pan, Changzhou (CN)

(73) Assignee: CHANGZHOU U SHENG ELECTRONIC LTD., Changzhou (CN)

( * ) Notice: Subject to any disclaimer, the term of this patent is extended or adjusted under 35 U.S.C. 154(b) by 0 days.

(21) Appl. No.: 15/652,278

(22) Filed: Jul. 18, 2017

(65) Prior Publication Data

US 2018/0063659 A1 Mar. 1, 2018

(30) Foreign Application Priority Data

Aug. 23, 2016 (CN) .......................... 2016 1 0708082

(51) Int. Cl.
| | | |
|---|---|---|
| *H04R 27/00* | (2006.01) | |
| *G08C 23/04* | (2006.01) | |
| *H05B 37/02* | (2006.01) | |
| *H05B 33/08* | (2006.01) | |

(52) U.S. Cl.
CPC ............. *H04R 27/00* (2013.01); *G08C 23/04* (2013.01); *H05B 33/0842* (2013.01); *H05B 37/0272* (2013.01); *H04R 2420/07* (2013.01); *H04R 2420/09* (2013.01)

(58) Field of Classification Search
CPC H04R 27/00; H04R 2420/07; H04R 2420/09; G08C 23/04; H05B 33/0842; H05B 37/0272

USPC .......................... 381/82, 301, 333, 364, 388
See application file for complete search history.

(56) References Cited

U.S. PATENT DOCUMENTS

| | | | | |
|---|---|---|---|---|
| 9,024,534 B2* | 5/2015 | McCune, Jr. | ....... | H05B 33/0815 315/246 |
| 2006/0228684 A1* | 10/2006 | Yoon | ...................... | G10H 1/368 434/307 A |
| 2011/0025290 A1* | 2/2011 | Chen | ..................... | H02M 3/155 323/311 |
| 2014/0150100 A1* | 5/2014 | Gupta | ................... | G06F 21/316 726/22 |

* cited by examiner

*Primary Examiner* — William A Jerez Lora
(74) *Attorney, Agent, or Firm* — Gokalp Bayramoglu (57) ABSTRACT

The present invention relates to an intelligent acousto-optic controller, which includes a power module, an infrared remote controller, a keyboard module, and an AC/DC constant current power module. Further, the intelligent acousto-optic controller includes an audio receiving module, an audio encoding and decoding module, a mixed audio control transmitting module, an audio input interface, an infrared receiving module, a mixed audio radio receiving and decoding control module, and a power amplifier loudspeaker module. The mixed audio control transmitting module and the mixed audio wireless receiving and decoding control module are connected wirelessly. Further, the power amplifier loudspeaker module is electrically connected to the mixed audio wireless receiving and decoding control module. The mixed audio wireless receiving and decoding control module is electrically connected to the AC/DC constant current power module. The present invention can realize acousto-optic control in an integrated way.

5 Claims, 6 Drawing Sheets

INTELLIGENT ACOUSTO-OPTIC CONTROLLER

CROSS REFERENCE TO RELATED APPLICATIONS

This application is based upon and claims priority to Chinese Patent Application No.:201610708082.4, filed on Aug. 23, 2016, the entire contents of which are incorporated herein by reference.

TECHNICAL FIELD

The present invention relates to a controller, particularly to an intelligent acousto-optic controller.

BACKGROUND

Currently, acoustic systems and light illumination systems for meetings, teaching offices, and open public places are usually arranged in a multi-point array. The controls of the acoustic system and light illumination are independently controlled by corresponding control systems. In that way, not only is wiring difficult, but also the wiring is inconvenient to use. Furthermore, an integrated control of the acoustic system and light illumination cannot be realized. Moreover, the illumination light is prone to stroboflash phenomenon when acted on by a control system, which likely leads to the fatigue of sight and hearing of the people in the area.

SUMMARY OF THE INVENTION

The object of the present invention is to provide an intelligent acousto-optic controller, which can control the sound and the light of acoustic and light illumination systems in an integrated way that is easy to wire and use. The problem in the prior art that the acoustic system and light illumination are independently controlled is addressed, such that the deficiency of the prior art is overcome.

In order to achieve the above object, the technical solution of the present invention is as below. An intelligent acousto-optic controller includes a wireless microphone audio transmitting module and an LED illumination module. The innovation points are as below. The intelligent acousto-optic controller further includes a power module, an infrared remote controller, a keyboard module, and an AC/DC constant current power module. The intelligent acousto-optic controller further includes a wireless microphone audio receiving module, an audio encoding and decoding module, a mixed audio control transmitting module, an audio input interface, an infrared receiving module, a mixed audio radio receiving and decoding control module, and a power amplifier loudspeaker module, which are powered by the power module.

The wireless microphone audio transmitting module is wirelessly connected to the wireless microphone audio receiving module by an antenna. The wireless microphone audio receiving module, the mixed audio control transmitting module, the keyboard module, the audio input interface, and the infrared receiving module are electrically connected to the corresponding connecting terminals of the audio encoding and decoding module respectively. The infrared control signal sent from the infrared remote controller is received by the infrared receiving module.

The mixed audio control transmitting module is wirelessly connected to the mixed audio wireless receiving and decoding control module by an antenna. Further, the power amplifier loudspeaker module is electrically connected to a corresponding connecting terminal of the mixed audio wireless receiving and decoding control module. The mixed audio wireless receiving and decoding control module is electrically connected to corresponding connecting terminals of the LED illumination module by the AC/DC constant current power module.

In the above technical solution, the power module includes a 5V direct current power adapter, a 3.3V main control power supply, and a 9V direct current power adapter. An output of the 5V direct current power adapter is electrically connected to an input of the 3.3V main control power supply. Further, the 5V direct current power adapter supplies power to the wireless microphone audio receiving module. The 3.3V main control power supply supplies power to the audio encoding and decoding module, the mixed audio control transmitting module, the audio input interface, and the infrared receiving module. The 9V direct current power adapter supplies power to the mixed audio wireless receiving and decoding control module and the power amplifier loudspeaker module.

In the above technical solution, the intelligent acousto-optic controller further includes a Bluetooth module. The Bluetooth module is powered by the power module, and the Bluetooth module is electrically connected to a corresponding connecting terminal of the audio encoding and decoding module.

In the above technical solution, the intelligent acousto-optic controller further includes a Bluetooth module. The Bluetooth module is powered by the 3.3V main control power supply of the power module. The Bluetooth module is electrically connected to a corresponding connecting terminal of the audio encoding and decoding module.

In the above technical solution, the audio encoding and decoding module includes an audio encoding and decoding device and a USB interface circuit of a single chip microcomputer that are in electrical connection to each other. The mixed audio control transmitting module includes a mixed audio control module and a radio frequency transmitting module electrically connected to one another. The mixed audio wireless receiving and decoding control module includes a radio frequency receiving module and an audio decoding module that are in electrical connection to each other. The infrared receiving module and the mixed audio control module are electrically connected to corresponding connecting terminals of the audio encoding and decoding device respectively. The radio frequency transmitting module is electrically connected to the radio frequency receiving module. The audio decoding module is electrically connected to corresponding connecting terminals of the power amplifier loudspeaker module.

The beneficial effects of the present invention are as below. After the intelligent acousto-optic controller of the present invention is used, the present invention further includes a power module, an infrared remote controller, a keyboard module, and an AC/DC constant current power module. The present invention further includes a wireless microphone audio receiving module, an audio encoding and decoding module, a mixed audio control transmitting module, an audio input interface, an infrared receiving module, a mixed audio radio receiving and decoding control module, and a power amplifier loudspeaker module, which are powered by the power module. The wireless microphone audio transmitting module is wirelessly connected to the wireless microphone audio receiving module by an antenna. The wireless microphone audio receiving module, the mixed audio control transmitting module, the keyboard module, the audio input interface, the infrared receiving module are electrically connected to the corresponding connecting terminals of the audio encoding and decoding module respectively. The infrared control signal sent from the infrared remote controller is received by the infrared receiving module. The mixed audio control transmitting module is wirelessly connected to the mixed audio wireless receiving and decoding control module by an antenna. Further, the power amplifier loudspeaker module is electrically connected to a corresponding connecting terminal of the mixed audio wireless receiving and decoding control module. The mixed audio wireless receiving and decoding control module is the electrically connected to corresponding connecting terminals of the LED illumination module by the AC/DC constant current power module.

During use of the present invention, the wireless microphone audio transmitting module of the wireless microphone is wirelessly connected to the wireless microphone audio receiving module by an antenna. The AC/DC constant current power module is electrically connected to the LED illumination module. An audio signal is sent to the wireless microphone audio receiving module by a wireless microphone through an antenna. The audio signal is sent to the audio encoding and decoding module to be encoded or decoded. The instructions sent from the Bluetooth module, the audio input interface, the infrared remote controller, and the keyboard module are sent to the audio encoding and decoding module to be encoded. The encoded instructions are processed by the mixed audio control transmitting module. Next, the processed instructions are wirelessly transmitted to the mixed audio wireless receiving and decoding control module to be decoded. The audio signal and LED lighting control signal are decoded by the mixed audio wireless receiving and decoding control module. The audio signal is amplified and sent to a loudspeaker by the power amplifier loudspeaker module. The LED lighting control signal is sent to the AC/DC constant current power module. The switch state of the LED illumination module is controlled by the AC/DC constant current power module, so as to prevent stroboflash in the illumination system.

The present invention can control sound and light simultaneously without causing cross interference between the sound control and the light control. Thus, using the present invention integrated control of the acoustic system and the illumination system can be achieved. The sound and the illumination can be optimally and uniformly distributed in a region, which greatly increases the comfort of the people in the affected region. A person who spends a long time in the region can enjoy the visual and auditory sensations provided by the system.

DETAILED DESCRIPTION OF THE EMBODIMENTS

Hereinafter, with reference to the drawings and given embodiments, the present invention is to further illustrated, but not limited thereto.

As shown in FIGS. 1-6, an intelligent acousto-optic controller includes wireless microphone audio transmitting module 1 and LED illumination module 16. The intelligent acousto-optic controller further includes a power module, infrared remote controller 8, keyboard module 9, AC/DC constant current power module 12, wireless microphone audio receiving module 2, audio encoding and decoding module 6, mixed audio control transmitting module 7, audio input interface 10, infrared receiving module 11, mixed audio radio receiving and decoding control module 14, and power amplifier loudspeaker module 15. Wireless microphone audio receiving module 2, audio encoding and decoding module 6, mixed audio control transmitting module 7, audio input interface 10, infrared receiving module 11, mixed audio radio receiving and decoding control module 14, and power amplifier loudspeaker module 15 are powered by the power module.

Wireless microphone audio transmitting module 1 is wirelessly connected to wireless microphone audio receiving module 2 by an antenna. Wireless microphone audio receiving module 2, mixed audio control transmitting module 7, keyboard module 9, audio input interface 10, infrared receiving module 11 are electrically connected to corresponding connecting terminals of audio encoding and decoding module 6 respectively. An infrared control signal sent from infrared remote controller 8 is received by infrared receiving module 11.

Mixed audio control transmitting module 7 is wirelessly connected to mixed audio wireless receiving and decoding control module 14 by an antenna. Power amplifier loudspeaker module 15 is electrically connected to a corresponding connecting terminal of mixed audio wireless receiving and decoding control module 14. Mixed audio wireless receiving and decoding control module 14 is electrically connected to corresponding connecting terminals of LED illumination module 16 by AC/DC constant current power module 12.

Figure 2:
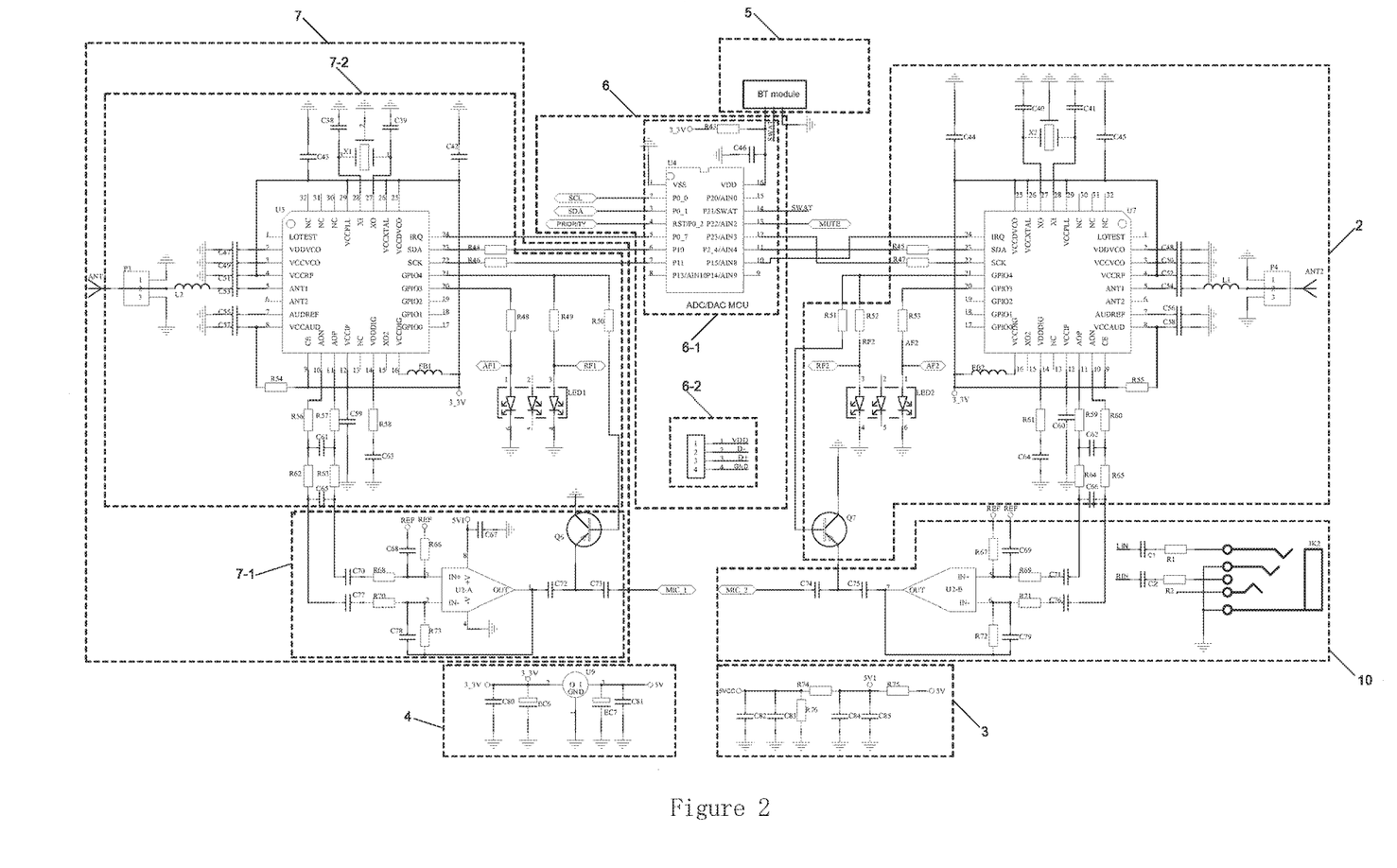
FIG. 2 is a circuit schematic diagram of a wireless microphone audio receiving module, a 5V direct current power adapter, a 3.3V main control power supply, a Bluetooth module, an audio encoding and decoding module, a mixed audio control transmitting module, and an audio input interface of the present invention.
Figure 3:
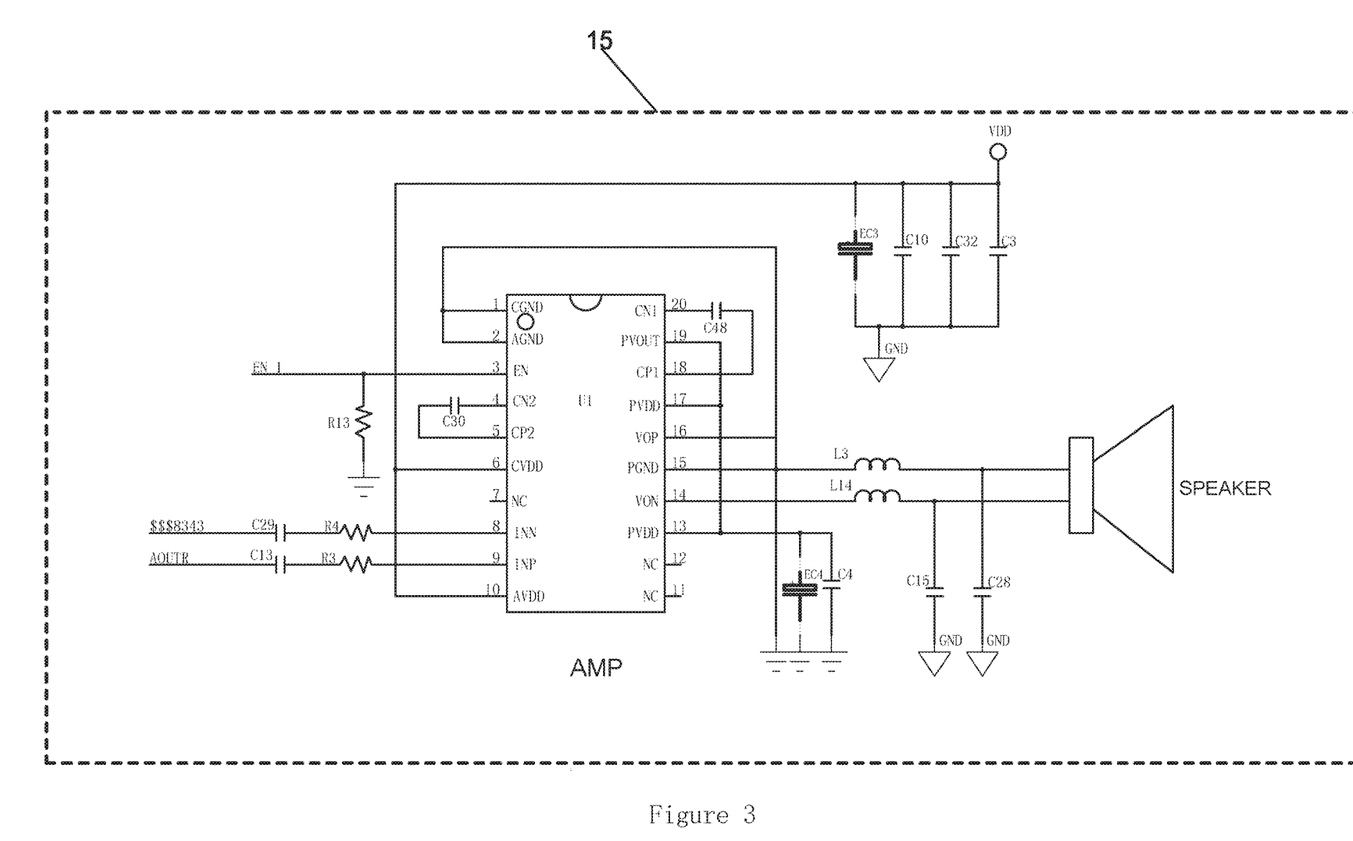
FIG. 3 is a circuit schematic diagram of the power amplifier loudspeaker module of the present invention.
Figure 4:
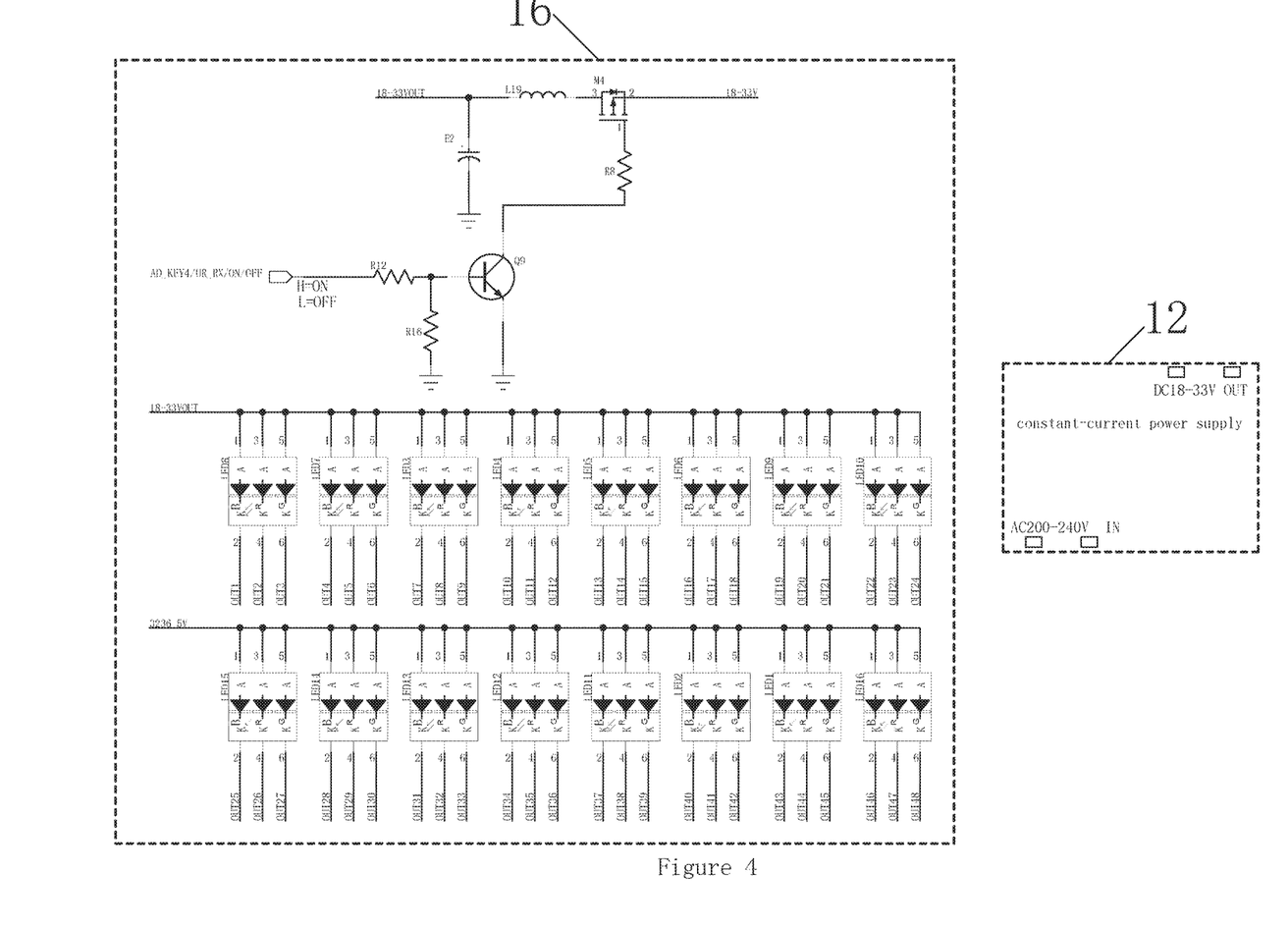
FIG. 4 is a circuit schematic diagram of an AC/DC constant current power module and an LED illumination module in the present invention.
Figure 5:
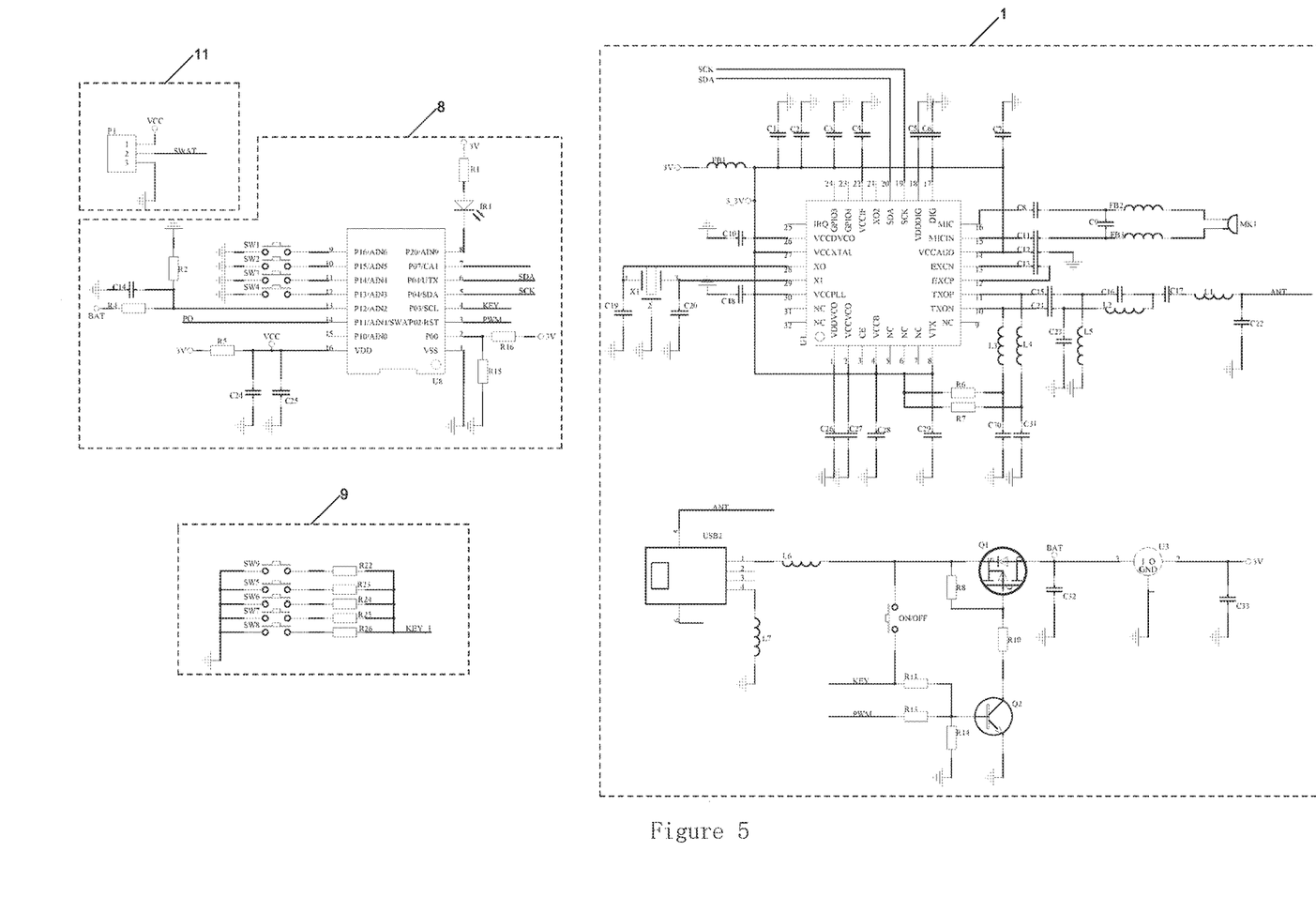
FIG. 5 is a circuit schematic diagram of a wireless microphone audio transmitting module, an infrared remote controller, a keyboard module, and an infrared receiving module of the present invention.
Figure 6:
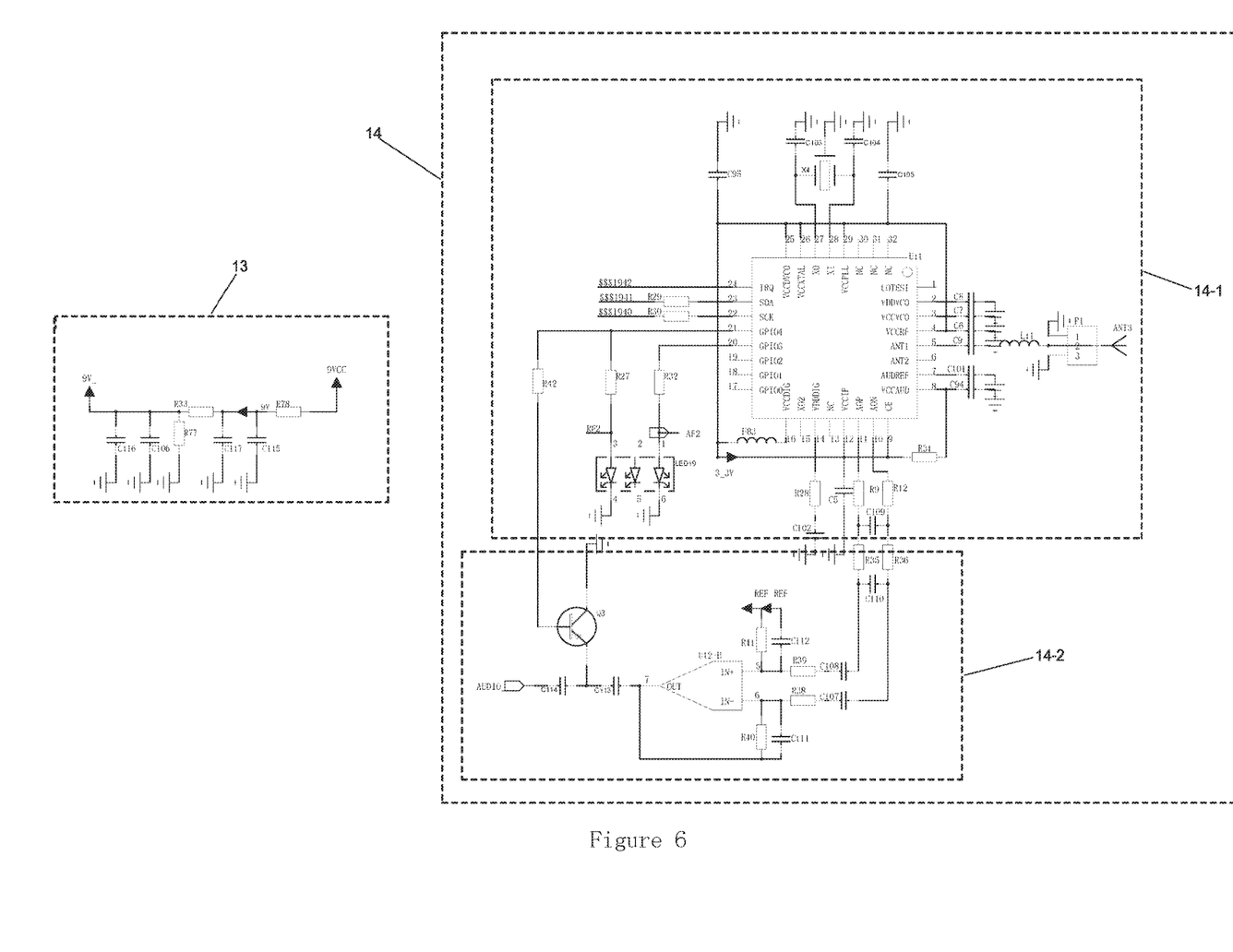
FIG. 6 shows a mixed audio radio wireless receiving and decoding control module and a 9V direct current power adapter of the present invention.

As shown in FIGS. 2 and 6, in order to make the structure of the present invention more reasonable and to provide proper working voltage to different modules, the power module includes 5V direct current power adapter 3, 3.3V main control power supply 4, and 9V direct current power adapter 13. An output of 5V direct current power adapter 3 is electrically connected to an input of 3.3V main control power supply 4. Further, 5V direct current power adapter 3 supplies power to wireless microphone audio receiving module 2. 3.3V main control power supply 4 supplies power to audio encoding and decoding module 6, mixed audio control transmitting module 7, audio input interface 10, and infrared receiving module 11. 9V direct current power adapter 13 supplies power to mixed audio wireless receiving and decoding control module 14 and power amplifier loudspeaker module 15.

Figure 1:
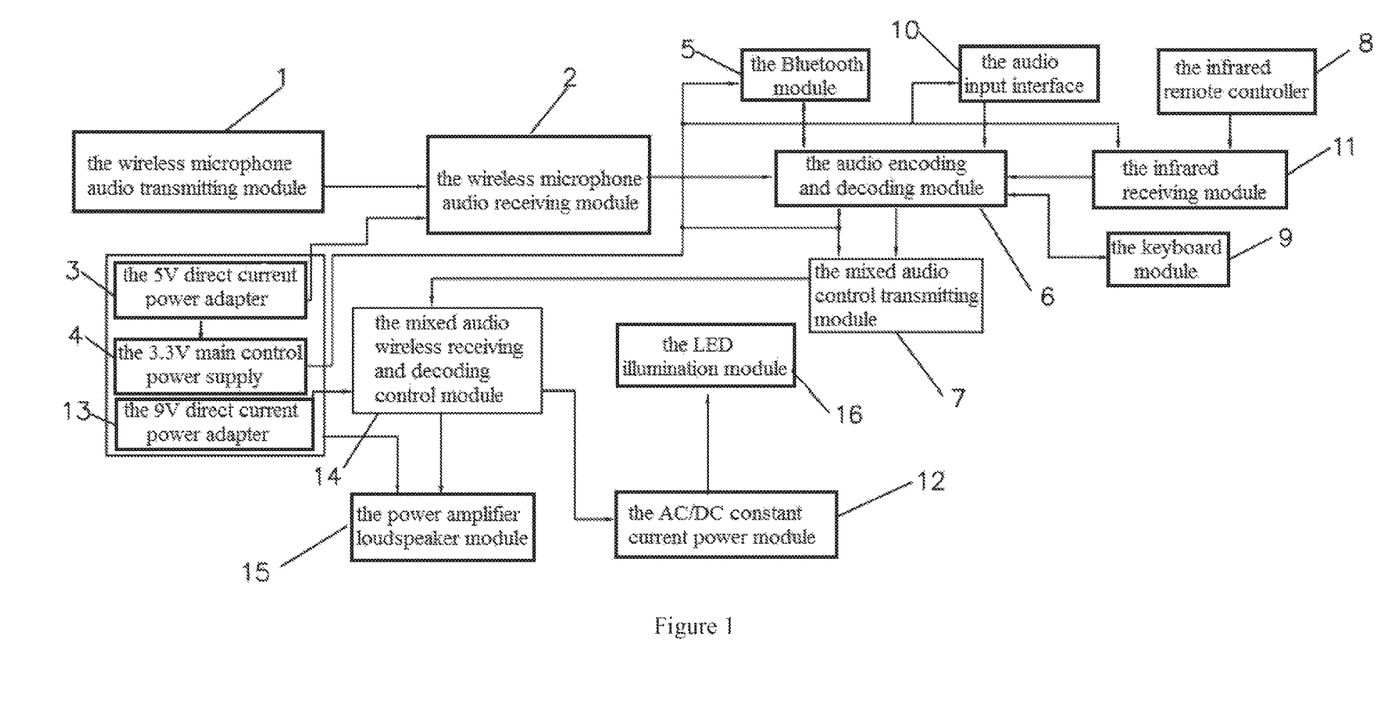
FIG. 1 is a schematic block diagram of the intelligent acousto-optic controller of the present invention.

As shown in FIGS. 1 and 2, in order to control the illumination system in different manners, the intelligent acousto-optic controller further includes Bluetooth module 5. Bluetooth module 5 is powered by the power module. Bluetooth module 5 is electrically connected to a corresponding connecting terminal of audio encoding and decoding module 6.

As shown in FIG. 2, in order to supply power to Bluetooth module properly, the intelligent acousto-optic controller further includes Bluetooth module 5. Bluetooth module 5 is powered by 3.3V main control power supply 4 of the power module. Bluetooth module 5 is electrically connected to a corresponding connecting terminal of audio encoding and decoding module 6.

As shown in FIGS. 2 and 6, in order to control the acoustic system and illumination system in a reasonable way, audio encoding and decoding module 6 includes audio encoding and decoding device 6-1 and USB interface circuit of single chip microcomputer 6-2 that are in electrical connection to each other. Mixed audio control transmitting module 7 includes mixed audio control module 7-1 and radio frequency transmitting module 7-2 that are in electrical connection to each other. Mixed audio wireless receiving and decoding control module 14 includes radio frequency receiving module 14-1 and audio decoding module 14-2 that are in electrical connection to each other. Infrared receiving module 11 and mixed audio control module 7-1 are electrically connected to corresponding connecting terminals of audio encoding and decoding device 6-1 respectively. Radio frequency transmitting module 7-2 is electrically connected to radio frequency receiving module 14-1. Audio decoding module 14-2 is electrically connected to a corresponding connecting terminal of power amplifier loudspeaker module 15.

The specific working process of the present invention is as follows. When in use, wireless microphone audio transmitting module 1 of the wireless microphone is wirelessly connected to wireless microphone audio receiving module 2 by an antenna. AC/DC constant current power module 12 is electrically connected to LED illumination module 16. An audio signal is sent to wireless microphone audio receiving module 2 by a wireless microphone through an antenna. The audio signal is sent to audio encoding and decoding module 6 to be encoded or decoded. The instructions sent from Bluetooth module 5, audio input interface 10, infrared remote controller 8, and keyboard module 9 are sent to audio encoding and decoding module 6 to be encoded. The encoded instructions are processed by mixed audio control transmitting module 7. Next, the processed instructions are wirelessly transmitted to mixed audio wireless receiving and decoding control module 14 to be decoded. The audio signal and LED lighting control signal are decoded by mixed audio wireless receiving and decoding control module 14. The audio signal is amplified and sent to a loudspeaker by power amplifier loudspeaker module 15. The LED lighting control signal is sent to AC/DC constant current power module 12. The switch state of LED illumination module 16 is controlled by AC/DC constant current power module 12, so as to prevent stroboflash in the illumination system.

The present invention can control the sound and the light in combination without causing cross interference between the sound control and the light control. The integrated control of the acoustic system and the illumination system can be achieved. The sound and the illumination can be optimally distributed and uniformly surrounded in a region, which greatly increases the comfort of the people in the affected area. A person who spends a long time in the region can enjoy the visual and auditory sensations of the system.

What is claimed is:

1. An intelligent acousto-optic controller, comprising:
   a wireless microphone audio transmitting module;
   an LED illumination module;
   a power module;
   an infrared remote controller;
   a keyboard module;
   an AC/DC constant current power module;
   a wireless microphone audio receiving module;
   an audio encoding and decoding module;
   a mixed audio control transmitting module;
   an audio input interface;
   an infrared receiving module;
   a mixed audio radio receiving and decoding control module; and
   a power amplifier loudspeaker module;
   wherein
   the wireless microphone audio receiving module, the audio encoding and decoding module, the mixed audio control transmitting module, the audio input interface, the infrared receiving module, the mixed audio radio receiving and decoding control module, and the power amplifier loudspeaker module are powered by the power module;
   the wireless microphone audio transmitting module is wirelessly connected to the wireless microphone audio receiving module by an antenna;
   the wireless microphone audio receiving module, the mixed audio control transmitting module, the keyboard module, the audio input interface, the infrared receiving module are electrically connected to corresponding connecting terminals of the audio encoding and decoding module respectively;
   an infrared control signal sent from the infrared remote controller is received by the infrared receiving module;
   the mixed audio control transmitting module is wirelessly connected to the mixed audio wireless receiving and decoding control module by an antenna;
   the power amplifier loudspeaker module is electrically connected to a corresponding connecting terminal of the mixed audio wireless receiving and decoding control module; and
   the mixed audio wireless receiving and decoding control module is electrically connected to a corresponding connecting terminal of the LED illumination module by the AC/DC constant current power module;
   wherein the audio encoding and decoding module receives instructions for audio and/or lighting control from at least one of the infrared remote controller, the audio input interface or the keyboard module and encodes the instructions;
   the mixed audio control transmitting module processes the encoded instructions and transmits the processed instructions wirelessly to the mixed audio wireless receiving and decoding control module;
   wherein the mixed audio wireless receiving and decoding control module decodes the instructions to determine audio signals and lighting control signals;
   wherein the mixed audio wireless receiving and decoding control module transmits the audio signals to the power amplifier loudspeaker module where the audio signals are amplified and sent to a loudspeaker by power amplifier loudspeaker module;
   wherein the mixed audio wireless receiving and decoding control module transmits the lighting control signals to the AC/DC constant current power module, wherein the AC/DC constant current power module controls the switching state of the LED illumination module according to the lighting control signals.

2. The intelligent acousto-optic controller of claim 1, wherein
the power module comprises a 5V direct current power adapter, a 3.3V main control power supply, and a 9V direct current power adapter;
an output of the 5V direct current power adapter is electrically connected to an input of the 3.3V main control power supply;
the 5V direct current power adapter supplies power to the wireless microphone audio receiving module;
the 3.3V main control power supply supplies power to the audio encoding and decoding module, the mixed audio control transmitting module, the audio input interface, and the infrared receiving module; and
the 9V direct current power adapter supplies power to the mixed audio wireless receiving and decoding control module and the power amplifier loudspeaker module.

3. The intelligent acousto-optic controller of claim 1, further comprising
a Bluetooth module;
wherein
the Bluetooth module is powered by the power module; and
the Bluetooth module is electrically connected to a corresponding connecting terminal of the audio encoding and decoding module.

4. The intelligent acousto-optic controller of claim 2, further comprising
a Bluetooth module;
wherein
the Bluetooth module is powered by the 3.3V main control power supply of the power module; and
the Bluetooth module is electrically connected to a corresponding connecting terminal of the audio encoding and decoding module.

5. The intelligent acousto-optic controller of claim 1, wherein
the audio encoding and decoding module comprising
an audio encoding and decoding device; and
a USB interface circuit of a single chip microcomputer;
wherein the audio encoding and decoding device is electrically connected to the USB interface circuit;
the mixed audio control transmitting module comprising
a mixed audio control module; and
a radio frequency transmitting module;
wherein the mixed audio control module is electrically connected to the radio frequency transmitting module;
the mixed audio wireless receiving and decoding control module comprises
a radio frequency receiving module; and
an audio decoding module;
wherein the radio frequency receiving module is electrically connected to the audio decoding module;
the infrared receiving module and the mixed audio control module are electrically connected to corresponding connecting terminals of the audio encoding and decoding device; and
the audio decoding module is electrically connected to a corresponding connecting terminal of the power amplifier loudspeaker module.

* * * * *